United States Patent Office 3,705,027
Patented Dec. 5, 1972

3,705,027
MICROBIOCIDAL NAPHTHENYL IMIDAZOLINES
Phillip Adams, Murray Hill, and Alfonso N. Petrocci,
Glen Rock, N.J., assignors to Millmaster Onyx Corporation, New York, N.Y.
No Drawing. Filed Dec. 9, 1969, Ser. No. 883,641
Int. Cl. A01n 9/22
U.S. Cl. 71—67
3 Claims

ABSTRACT OF THE DISCLOSURE

The use of 1-aminoethyl-2-naphthenyl imidazoline, having the structure:

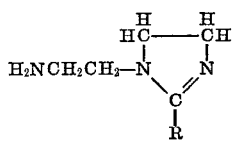

wherein R is the residue of a naphthene-carboxylic acid as a microbiocidal preservative agent.

---

This invention relates to the microbiocidal use of 1-aminoethyl-2-naphthenyl imidazoline, having the structure:

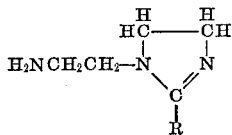

wherein R is the residue of a naphthene-carboxylic acid.

It has been discovered that the above naphthenyl imidazolines have a high order of microbiocidal effectiveness which is greatly superior to other imidazolines having different acid residues.

The compounds of this invention and their salts are particularly useful as preservatives for industrial water, either as a coolant, as in cooling towers, air-conditioners, humidifiers and the like; or for process water, as in paper manufacture to prevent slime formation and the like.

They may also be introduced into waters employed in flooding for secondary oil recovery, to prevent clogging of the sands by the growth of microorganisms. These compounds may also be employed as preservatives for metal-working lubricants, such as cutting and grinding fluids, against microbial decomposition which causes breaking of emulsions, putrefaction and the incidence of dermatitis resulting from the handling of contaminated or "spoiled" lubricants.

They are further utilizable to preserve cosmetics so as to prevent phase separation, discoloration and other effects of microbial proliferation, including that of pathogenic strains of microorganisms which may cause serious or minor infection of the skin or miccosa.

These compounds may also be used to preserve jet-fuels from microbial growth which may result in the clogging of nozzles; similarly, they may be used as preservatives in fuel oils to prevent corrosion of tanks, lines and the like.

Naphthenic acids are well known to the art and are available commercially, primarily as the result of various extractive procedures carried out in refining naturally occurring petroleums and petroleum fractions, particularly gas-oil distillates boiling in the range of 400–700° F. Naphthenic acids are found particularly in petroleums originating in the western part of the United States, especially in California; in the northern part of South America, especially Venezuela, Colombia and Aruba; in the southern part of Europe, especially Rumania, and, to a lesser extent, in crude oils originating in Louisiana, along the Texas gulf coast, in Peru, Mexico, Poland, the Soviet Union and Germany.

The chemical nature of these naphthenic acids is more or less ill-defined, but they all have in common the characteristic of possessing alicyclic nuclei. These may be five or six membered carbon atom ring systems, various condensed ring systems, and other related materials as disclosed in Fieser, "Organic Chemistry," 3rd ed. 1956, pp. 97–98.

EXAMPLE 1

2,324 grams (or 9.28 mols) of Enjay's Refined Naphthenic Acid having an acid number of 224, and 1,265 grams (or 12.07 mols) of diethylene triamine were charged into an agitated flask fitted with a packed fractionating column system for the purpose of separating and removing water formed in the reaction and returning stripped amine to the reactor. Aquametric titration of the charged amine indicated a water content of 1.17%.

The mixture was agitated and heated under reduced pressure at about 150° C. pot temperature and at 216 mm. pressure, gradually raising the pot temperature to about 200° C. during a period of about 12 hours. The water of reaction distilled along with some of the diethylene triamine, through the fractionating column, which stripped off the water and returned the amine to the reactor. When no more water distilled, the excess amine was distilled off at about 5 mm. pressure and 190° C.

The total amount of water collected was 321 grams; correcting for the initial water content, 17 mols of water was obtained, or 91.5% of the theoretical amount for the formation of the imidazoline.

A weighed sample was titrated potentiometrically to the first break with HCl in alcohol, indicating 87.4% activity. After reacting the non-tertiary nitrogen with phenyl isothiocyanate, titration with perchloric acid indicated 95.2% reaction.

The product was found to be effective against aerobic bacteria at from 25 to 150 parts per million at 37° C. during four hours.

EXAMPLE 2

The product was assayed bacteriologically by the Standard Groth Dilution Test Method. Aliquots of a solution of the aminoethyl naphthenyl imidazoline were added to appropriate broth culture media contained in test tubes, so that various concentrations were obtained. The tubes so prepared were inoculated with 24 hour broth cultures of the test bacteria, or 14 day aqueous spore suspensions of the test fungi, or 7 day broth cultures of the algae. The inoculated tubes were incubated as follows: bacteria for 72 hours at 37° C.; fungi for 14 days at 28° C.; algae for 7 days at 25° C. Following the aforementioned incubation periods the tubes were examined for the presence or absence of macroscopic growth. The lowest concentration of test material not permitting macroscopic growth is designated as the Minimum Inhibitory Level.

The test organisms employed were: *Excherichia coli* =E.c.; *Pseudomonas aeruginosa*=Ps.a.; *Staphylococcus aureus*=S.a.; *Streptococcus faecalis*=S.f.; *Aspergillus niger*=A.n.; *Penicillium expansum*=P.e.; and *Chlorella pyrenoidosa*=C.p.

TABLE 1
[Parts per million of 1-aminoethyl-2-naphthenyl imidazoline]

| Gram negative | | Gram positive | | Fungi | | Algae |
|---|---|---|---|---|---|---|
| E.c. | Ps.a. | S.a. | S.f. | A.n. | P.e. | C.p. |
| 10 | 250 | 10 | 10 | 500 | 500 | 10 |

EXAMPLE 3

At 0.5% of 1-aminoethyl-2-naphthenyl imidazoline as a component of face creams and lotions, microbial growth on storage was found to be negligible. In the case of other cosmetic preparations, such as baby lotions, hair-set preparation, powders, shampoos, and the like, preservative action was excellent in the range of 0.1% to 2% by weight.

EXAMPLE 4

Cutting and grinding fluids and especially the water-soluble or water-dispersible types containing, for example, amine soaps, and salts of organic phosphate esters, tallow soaps, mahogany soaps and other hydrocarbon sulfonates, were effectively preserved against microbial action over a period of weeks by the addition of about 200 parts per million of the imidazoline in the lubricant as diluted for use.

EXAMPLE 5

Jet fuel oil containing 50 p.p.m. of water was shaken with a quantity of contaminated sludge from a fuel storage tank. The oily layer was separated, and treated with 0.2% of the imidazoline of the present invention.

After two weeks, samples were plated and found to be essentially free of microorganisms.

Ordinary fuel oil so treated also failed to support microbial growth.

The compound 1-aminoethyl-2-naphthenyl imidazoline is therefore eminently suitable for the treatment of recirculated water, as in cooling towers, air-conditioners, humidifiers, and dehumidifiers and the like; and for the treatment of process water, as for example in paper manufacture, to inhibit the growth of microorganisms causing putrefaction and slime formation, as well as for flooding for secondary oil recovery.

This compound may be employed either as the free amine or as its salts of inorganic or organic acids. Such acids may include, for example, hydrochloric, sulfuric, phosphoric, acetic, lauric, oleic, gluconic, oxalic, tartaric, citric, benzoic and substituted benzoic, paratoluene sulfonic, sulfamic, and the like.

As indicated in Example 4, above, the present compounds may be introduced into metal-working fluids, to preserve them against microbial action which results in decomposition and putrefaction, or breaking of emulsions, or to prevent dermatitis resulting from contact with spoiled cutting and grinding oils and the like.

As further indicated above, the present compounds are highly effective as preservatives for cosmetics so contaminated; and may, in addition, be effectively utilized in soaps and other detergents to make them germicidal.

In summary, therefore, the present compounds have exhibited a high degree of microbiocidal activity in fluid substance generally, the term "fluid" being generically used to denote not only liquids but powders and the like, since the primary consideration is the ability to disperse the microbiocidal compound homogeneously throughout the substance being treated.

The invention claimed is:

1. A method for inhibiting the growth of bacteria, fungi and algae in water, which comprises applying to the growth in said water an amount sufficient to inhibit such growth of 1-aminoethyl-2-naphthenyl imidazoline or a salt thereof selected from the group consisting of the hydrochloric, sulfuric, phosphoric, acetic, lauric, oleic, gluconic, oxalic, tartaric, citric, benzoic, paratoluene, sulfonic and sulfamic acid salts.

2. The method of claim 1 wherein the water is in a recirculated water system.

3. The method of claim 1 wherein the water is a process water used in a manufacturing process.

References Cited

UNITED STATES PATENTS

| | | | |
|---|---|---|---|
| 2,738,325 | 3/1956 | Rydell | 424—273 |
| 2,832,715 | 4/1958 | Jezl et al. | 424—30 |
| 3,251,662 | 5/1966 | Fareri et al. | 424—273 |
| 3,502,578 | 3/1970 | Raifsnider | 210—309.6 |

STANLEY J. FRIEDMAN, Primary Examiner

V. D. TURNER, Assistant Examiner

U.S. Cl. X.R.

44—63; 210—64; 252—107; 424—273